(12) United States Patent
Li

(10) Patent No.: US 12,355,941 B2
(45) Date of Patent: Jul. 8, 2025

(54) VIDEO ENCODING METHOD AND APPARATUS, COMPUTER DEVICE, AND STORAGE MEDIUM

(71) Applicant: Tencent Technology (Shenzhen) Company Limited, Guangdong (CN)

(72) Inventor: Dalong Li, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 326 days.

(21) Appl. No.: 17/678,931

(22) Filed: Feb. 23, 2022

(65) Prior Publication Data
US 2022/0256140 A1 Aug. 11, 2022

Related U.S. Application Data

(63) Continuation of application No. PCT/CN2020/124536, filed on Oct. 28, 2020.

(30) Foreign Application Priority Data

Mar. 2, 2020 (CN) .......................... 202010135358.0

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/124* (2014.11); *H04N 19/132* (2014.11); *H04N 19/186* (2014.11)

(58) Field of Classification Search
CPC .. H04N 19/105; H04N 19/117; H04N 19/124; H04N 19/132; H04N 19/186;
(Continued)

(56) References Cited

U.S. PATENT DOCUMENTS 10,798,399 B1 * 10/2020 Wei ...................... H04N 19/132
2018/0020224 A1 * 1/2018 Su ......................... H04N 19/192
(Continued)

FOREIGN PATENT DOCUMENTS

CN  1459981 A  12/2003
CN  101272489 A  9/2008
(Continued)

OTHER PUBLICATIONS

International Search Report and Written Opinion issued Jan. 19, 2021 in International Application No. PCT/CN2020/124536 with English translation, 9 pgs.

(Continued)

*Primary Examiner* — Sath V Perungavoor
*Assistant Examiner* — Tyler B Edwards
(74) *Attorney, Agent, or Firm* — ArentFox Schiff LLP

(57) ABSTRACT

A method of video encoding is described. The method includes segmenting original video data to obtain an original video segment including multiple video images. Video content analysis is performed on the original video segment to obtain a video image processing parameter corresponding to the original video segment. Image processing is performed on a video image in the multiple video images in the original video segment based on the video image processing parameter to obtain a processed video segment. An encoding parameter of the processed video segment can be determined based on image feature data of the processed video segment. The processed video segment can be encoded based on the encoding parameter to obtain an encoded video segment.

20 Claims, 8 Drawing Sheets

(51) Int. Cl.
*H04N 19/124* (2014.01)
*H04N 19/132* (2014.01)
*H04N 19/186* (2014.01)

(58) Field of Classification Search
CPC .... H04N 19/154; H04N 19/179; H04N 19/85; H04N 21/234381; H04N 21/4402; H04N 21/8456
See application file for complete search history.

(56) References Cited

U.S. PATENT DOCUMENTS

2018/0139458 A1 5/2018 Wang et al.
2020/0195934 A1* 6/2020 Xing ..................... G06V 20/49

FOREIGN PATENT DOCUMENTS

| CN | 105264888 A | 1/2016 |
|---|---|---|
| CN | 107409221 A | 11/2017 |
| CN | 108734628 A | 11/2018 |
| CN | 19286825 A | 1/2019 |
| CN | 109729439 A | 5/2019 |
| CN | 110418177 A | 11/2019 |
| CN | 110996131 A | 4/2020 |
| WO | WO 2020/036502 A1 | 2/2020 |

OTHER PUBLICATIONS

Chinese Office Action issued Apr. 21, 2020 in Chinese Application No. 202010135358.0 with English translation, 11 pgs.
Chinese Office Action issued May 28, 2020 in Chinese Application No. 20210135358.0 with English translation, 9 pgs.
Chinese Office Action issued Jun. 30, 2020 in Chinese Application No. 202010135358.0 with English translation, 5 pgs.

* cited by examiner

VIDEO ENCODING METHOD AND APPARATUS, COMPUTER DEVICE, AND STORAGE MEDIUM

RELATED APPLICATION

This application is a continuation of International Application No. PCT/CN 2020/124536, filed on Oct. 28, 2020, which claims priority to Chinese Patent Application No. 202010135358.0, filed on Mar. 2, 2020. The entire disclosures of the prior applications are hereby incorporated by reference in their entirety.

FIELD OF THE TECHNOLOGY

Embodiments of this application relate to the field of video processing technologies, including a video encoding method and apparatus, a computer device, and a storage medium.

BACKGROUND OF THE DISCLOSURE

With the continuous development of networks and computer technologies, service users have higher expectations of the quality of experience of online videos.

When a video server on a network side provides an online video to a user terminal, the video server may push encoded video data to the user terminal. In the related art, the video server may encode the original video data by using a content-aware encoding technology. For example, the video server segments the original video data into video segments, then determines a set of proper encoding parameters for each video segment and encodes the corresponding video segment based on the determined encoding parameters.

In the solution shown in the related art, the video segment obtained by segmenting the original video data can be directly encoded. Consequently, in case the original video quality is too high or too low, video encoding efficiency and encoded video quality cannot be balanced.

SUMMARY

Aspects of the disclosure provide a method of video encoding. The method can include segmenting original video data to obtain an original video segment including multiple video images. Video content analysis is performed on the original video segment to obtain a video image processing parameter corresponding to the original video segment. Image processing is performed on a video image in the multiple video images in the original video segment based on the video image processing parameter to obtain a processed video segment. An encoding parameter of the processed video segment can be determined based on image feature data of the processed video segment. The processed video segment can be encoded based on the encoding parameter to obtain an encoded video segment.

Aspects of the disclosure provide an apparatus of video encoding. The apparatus can include processing circuitry configured to segment original video data to obtain an original video segment including multiple video images. Video content analysis is performed on the original video segment to obtain a video image processing parameter corresponding to the original video segment. Image processing is performed on a video image in the multiple video images in the original video segment based on the video image processing parameter to obtain a processed video segment. An encoding parameter of the processed video segment can be determined based on image feature data of the processed video segment. The processed video segment can be encoded based on the encoding parameter to obtain an encoded video segment.

A non-transitory computer-readable storage medium storing instructions which when executed by at least one processor cause the at least one processor to perform the method of video encoding.

The technical solutions provided herein may have the following advantages. Before an encoding parameter is determined, first, image processing is performed on an original video segment; and then, an encoding parameter corresponding to a processed video segment is determined for encoding. The video image quality of a to-be-encoded video segment is controlled within a proper quality range to avoid excessively high or low video image quality of the to-be-encoded video segment. In this way, a relationship between the video quality and the encoding parameter can be controlled, so that encoding efficiency and encoded video quality are balanced, thereby improving encoding performance.

BRIEF DESCRIPTION OF THE DRAWINGS

Accompanying drawings herein are incorporated into a specification and constitute a part of this specification, show embodiments that conform to this application, and are used for describing embodiments of this application together with this specification.

DESCRIPTION OF EMBODIMENTS

Figure 1:
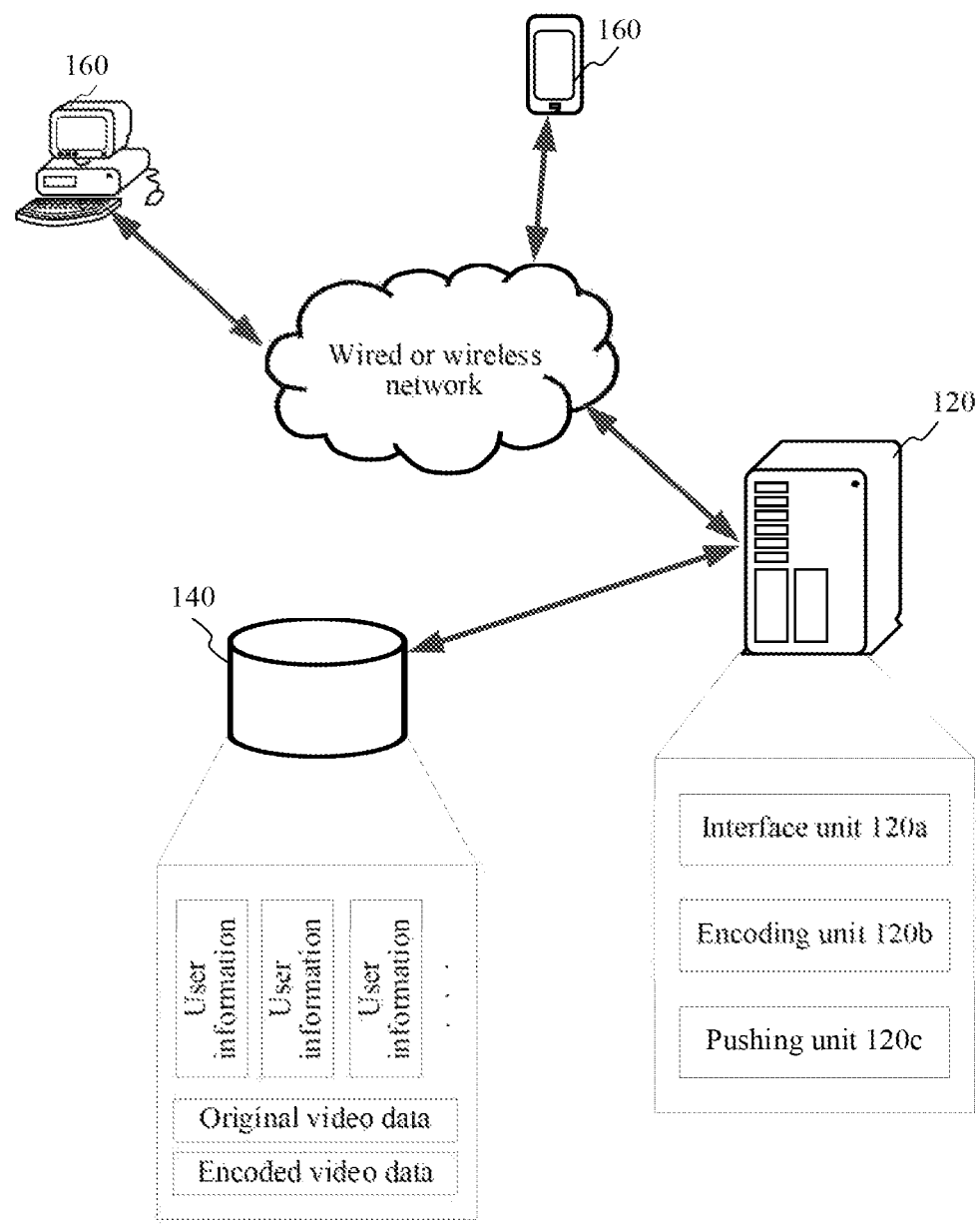
FIG. 1 is a system configuration diagram of a video service system according to various embodiments of this application.

Embodiments are described in detail herein with reference to the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of devices and methods that are described in detail in the appended claims and that are consistent with some aspects of this application.

The present disclosure provides various video encoding solutions. These solutions can better match image quality and encoding parameters based on artificial intelligence (AI) and balance video encoding efficiency and encoded video quality. For ease of understanding, the terms involved in this application are explained below.

(1) Shot Segmentation

In this application, shot segmentation is to segment an inputted original video source (which is to be encoded) into several "shots" (each corresponding to a segment) that are consecutive in time, in which segmentations (segments) do not overlap, and in which all segmentations (segments) may be combined into the original video source in sequence. To ensure optimal performance of an entire system, images with continuous time ranges and similar content are divided into one segment, which is referred to as a "shot". Subsequent processing is performed by using video image segments represented by these "shots".

(2) Artificial Intelligence (AI)

AI is a theory, method, technology and application system that uses digital computers or machines controlled by digital computers to simulate, extend and expand human intelligence, perceive the environment, acquire knowledge, and use knowledge to obtain the best results. In other words, AI is a comprehensive technology in computer science and attempts to understand the essence of intelligence and produce a new intelligent machine that can react in a manner similar to human intelligence. AI is to study the design principles and implementation methods of various intelligent machines to enable the machines to have the functions of perception, reasoning, and decision-making.

AI technology is a comprehensive discipline and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and machine learning (ML)/deep learning.

With the research and progress of artificial intelligence technologies, the artificial intelligence technologies have been researched and applied in many fields, such as common smart homes, smart wearable devices, virtual assistants, smart speakers, smart marketing, unmanned driving, autonomous driving, drones, robots, smart medical care, smart customer services, and smart video services. With the development of technologies, artificial intelligence technologies will be applied to more fields and have more important value.

(3) Machine Learning (ML)

ML is a multi-field interdisciplinary technology and relates to a plurality of disciplines such as probability theory, statistics, approximation theory, convex analysis, and algorithm complexity theory. ML specializes in studying how a computer simulates or implements a human learning behavior to obtain new knowledge or skills, and reorganize a knowledge structure, so as to keep improving its performance. ML is a core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

The technical solutions provided in the embodiments of this application involve technologies such as machine learning of AI and are specifically described by using the following embodiments.

FIG. 1 is a system configuration diagram of a video service system according to various embodiments of this application. As shown in FIG. 1, the system includes a server 120, a database 140, and several terminals 160.

The server 120 is a server or a server cluster including a plurality of servers, or a virtualization platform, or a cloud computing service center.

The server 120 may be a server that provides background support for a video service application. The server 120 may include one or more functional units.

In a possible implementation, as shown in FIG. 1, the server 120 may include an interface unit 120a, an encoding unit 120b, and a pushing unit 120c.

The interface unit 120a is configured to exchange information with a video service application installed in each terminal 160 to obtain related information about a user corresponding to the terminal 160, for example, user account information and user operation information.

The encoding unit 120b is configured to encode unencoded video data to obtain an encoded video.

The pushing unit 120c is configured to push the encoded video to a terminal 160 corresponding to each user.

The database 140 may be a Redis database or another type of database. The database 140 is configured to store various types of data, for example, user information of each user, unencoded original video data, and encoded video data.

For example, after obtaining the related information about the user corresponding to each terminal, the interface unit 120a stores the related information about the user in the database 140, the encoding unit 120b stores encoded original video data in the database 140 after encoding original video data in the database 140, and the pushing unit 120c extracts the encoded video data from the database 140 and pushes the encoded video data to the terminal corresponding to the user when pushing a video to the user.

Alternatively, in another possible implementation, the foregoing video encoding may be implemented by the terminal 160. For example, the terminal 160 may record original video data by using an image collection component or screen recording software, encode the recorded original video data, and upload encoded recorded original video data to a network side, so that another terminal obtains the uploaded encoded video data from the network side.

For example, the terminal 160 encodes original video data and uploads the encoded video data to the server 120. The server 120 stores the encoded video data in the database 140. When receiving a request sent by another terminal for acquiring the encoded video data, the server 120 may obtain the encoded video data from the database 140 and push the encoded video data to the another terminal, or acquire the encoded video data from the database 140 and send the encoded video data to a content delivery network, so that the another terminal obtains the encoded video data from the content delivery network.

The terminal 160 may be a terminal device that has a network connection function and on which a video service application corresponding to the server 120 is installed. For example, the terminal 160 may be a smartphone, a tablet computer, an e-book reader, smart glasses, a smartwatch, a Moving Picture Experts Group Audio Layer III (MP3) player, a Moving Picture Experts Group Audio Layer TV (MP4) player, a laptop computer, or a desktop computer. The terminal 160 may also be referred to as user equipment, a portable terminal, a laptop terminal, a desktop terminal, or the like, in various embodiments.

In the embodiments of this application, the video service application may include any application that provides continuous image frame streams, for example, including but not limited to a video playback application, a live video application, a game application, a communication application, a browser application, or the like.

The terminal 160 is connected to the server 120 by a communication network. The communication network can be a wired network or a wireless network.

In an example, the system may further include a management device (not shown in FIG. 1). The management device is connected to the server cluster 120 through the communication network. The communication network is a wired network or a wireless network.

In various examples, the wireless network or the wired network uses a standard communication technology and/or protocol. The network is generally the Internet, but may be any network, including, but not limited to, any combination of a local area network (LAN), a metropolitan area network (MAN), a wide area network (WAN), a mobile, wired, or wireless network, and a dedicated network or a virtual private network. In some embodiments, technologies and/or formats, such as the HyperText Markup Language (HTML) and the Extensible Markup Language (XML), are used for representing data exchanged through the network. In addition, all or some links may be encrypted by using related encryption technologies such as a secure socket layer (SSL), transport layer security (TLS), a virtual private network (VPN), and internet protocol security (IPsec). In some other embodiments, custom and/or dedicated data communication technologies may also be used in place of or in addition to the foregoing data communication technologies.

As smartphones supporting the 5th-generation new radio (5G NR) network connection gradually enter the market, 5G networks are soon to be fully commercialized. The technical characteristics of high throughput, low latency, and strong reliability of the 5G networks provide a solid foundation for the next generation of Internet services. Services, such as a video-on-demand service, low-latency live broadcast, a cloud game, and Internet of Things, that rely heavily on the quality of network infrastructure will get huge development.

Figure 2:
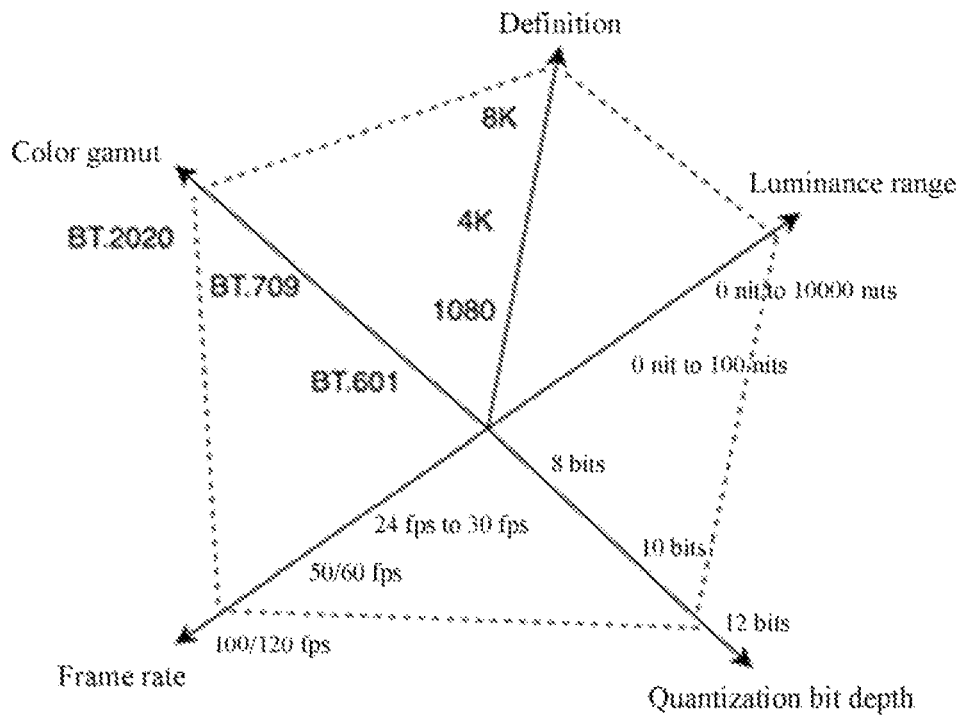
FIG. 2 is a schematic diagram of ultra-high-definition dimension decomposition according to this application.

With the continuous improvement of people's audiovisual enjoyment and the continuous upgrading of related devices in the industry chain, the trend of consumer video services will inevitably move toward higher definition and better experience. As a result, a high-definition (HD) video represented by 720P/1080P starts to upgrade to an ultra-high-definition (UHD) video. Different from the improvement in the HD era, in addition to the most intuitive image definition improvement, the improvement of the ultra-high-definition video also includes the upgrade of a total of five typical dimensions of video property: a frame rate, a dynamic range, a color gamut, and a bit depth. FIG. 2 is a schematic diagram of the ultra-high-definition video property dimension decomposition in this application. As shown in FIG. 2, upgrades of dimensions of an ultra-high-definition (UHD) video lead to an obvious increase of a video bit rate. Achieving an efficient compression remains a great challenge even with a 5G high bandwidth. In some examples, the following two main approaches for video compression of the ultra-high-definition video are employed:

(1) Search for algorithm tools with higher compression efficiency, such as a versatile video coding (VVC) video compression standard, an AV1/AV2 video compression standard, or an audio-video coding standard 3 (AVS3) video compression standard.

(2) Do not rely on a specific video compression standard, and combine with mature machine learning and AI capabilities in recent years to improve rate allocation efficiency in an encoding process. To be specific, more bit rates are allocated to areas that are important or more sensitive to subjective visual perception, and less bit rate are allocated to areas that are not important or less sensitive to subjective visual perception, to reduce a bit rate without changing overall subjective quality.

The above approaches (1) and (2) may be combined into a content-aware encoding (CAE) technology. The CAE technology can be used for a video, and on the premise of maintaining the same subjective visual quality, aim to reduce the bit rate. Characteristics in a plurality of dimensions such as the frame rate and the quantization bit depth of the ultra-high-definition video are not considered. Therefore, parameters of the plurality of dimensions of the ultra-high-definition video cannot be integrated to "best" balance (or trade-off) the visual quality and the bit rate.

To resolve the foregoing problem, the present disclosure provides solutions and technologies to better balance video encoding efficiency and encoded video quality.

Figure 3:
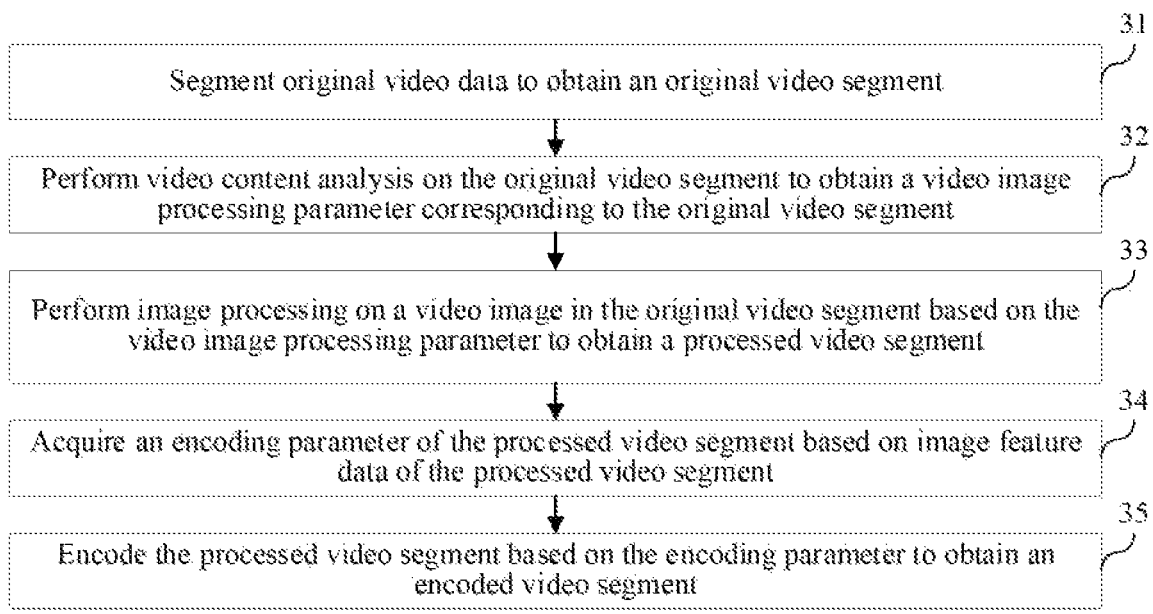
FIG. 3 is a flowchart of a video encoding method according to an exemplary embodiment.

FIG. 3 is a flowchart of an exemplary video encoding method according to an embodiment. The video encoding method may be applicable to a computer device, for example, the server or the terminal in the system shown in FIG. 1. As shown in FIG. 3, the video encoding method may include the following steps.

In Step 31, original video data can be segmented to obtain an original video segment. The segmentation of the original video data may result in multiple segments.

The original video data may be segmented in a way similar to shot segmentation.

In Step 32, video content analysis can be performed on the original video segment to obtain a video image processing parameter(s) corresponding to the original video segment.

In an example, the video image processing parameter obtained through video content analysis may correspond to (or include) processing parameters of one or more dimensions of the ultra-high-definition video shown in FIG. 2.

In Step 33, image processing can be performed on a video image in the original video segment based on the video image processing parameter to obtain a processed video segment.

In an example, the computer device may adjust parameters of one or more dimensions of the original video segment based on the video image processing parameter to obtain the processed video segment.

In Step 34, an encoding parameter(s) (including one or more parameters) of the processed video segment can be acquired (determined) based on image feature data of the processed video segment.

In Step 35, the processed video segment can be encoded based on the encoding parameter(s) to obtain an encoded video segment.

After encoding all video segments to obtain encoded video segments, the computer device may further combine all the encoded video segments according to timings of a sequence of the segments to obtain encoded video data and push the encoded video data, for example, to a server/content delivery network or another terminal.

Figure 4:
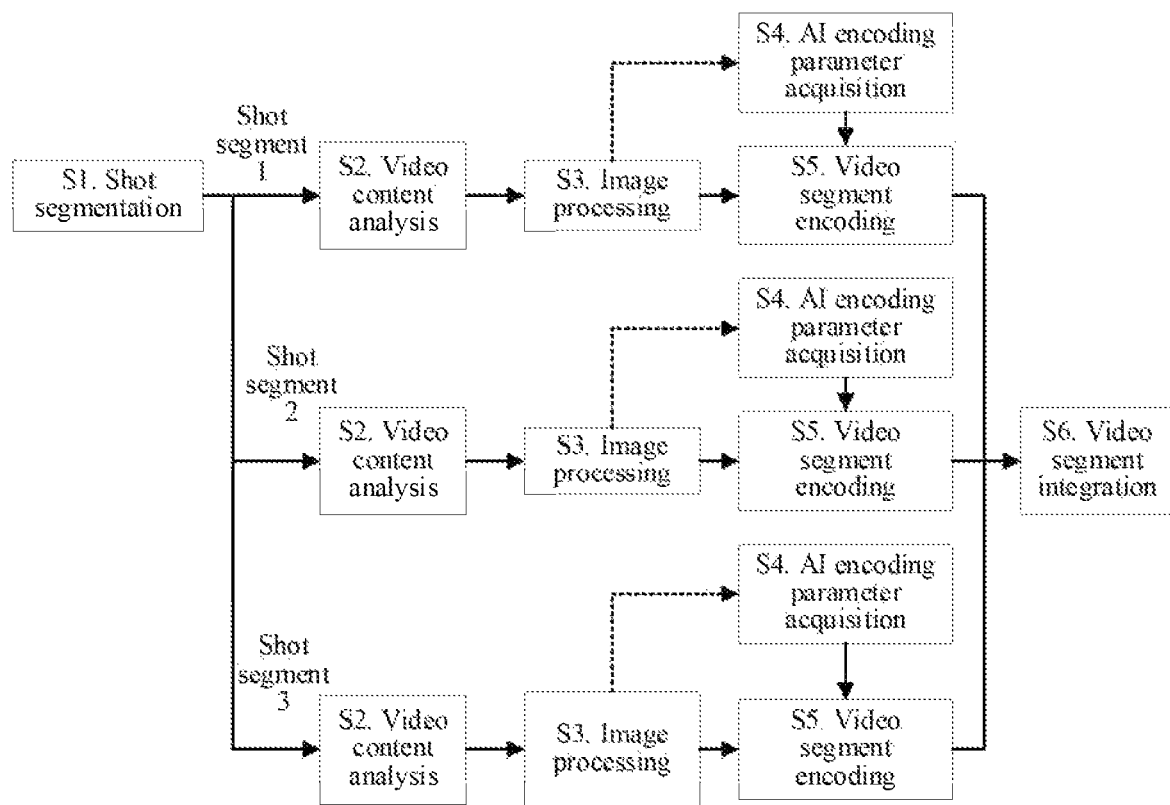
FIG. 4 is a schematic flowchart of video encoding according to the embodiment shown in FIG. 3.

For example, FIG. 4 is a schematic flowchart of video encoding according to an embodiment of this application. As shown in FIG. 4, shot segmentation in step S1 is performed on original video data to obtain original video segments (shot segments 1-3). Video content analysis in step S2 is performed on each original video segment to obtain a corresponding video image processing parameter (that may correspond to a group of processing parameters). Then, image processing in step S3 is performed to obtain respective processed video segments. Next, AI encoding parameter acquisition in step S4 and video segment encoding in step S5 are performed to obtain an encoded video segment. Subsequently, the video segment integration in step S6 is performed to obtain encoded video data.

After the original video segment is obtained through segmentation by using the foregoing solution, first, image processing is performed on the original video segment; and then, an encoding parameter(s) corresponding to the processed video segment is determined for encoding. In this way, a relationship between video quality and the encoding parameters can be controlled in the encoding parameter acquisition process. For example, when the video quality of the original video segment is too high, the video quality of the original video segment may be properly reduced to shorten an encoding time and improve encoding efficiency. Correspondingly, when the video quality of the original video segment is low, the video quality of the original video segment may be properly improved to ensure encoded video quality.

According to the solution shown herein, before an encoding parameter is determined, first, image processing is performed on an original video segment to generate a processed video segment; and then, an encoding parameter corresponding to the processed video segment is determined for encoding. Video image quality of a to-be-encoded video segment is controlled within a proper quality range to avoid excessively high or low video image quality of the to-be-encoded video segment. In this way, a relationship between the video quality and the encoding parameter can be controlled, so that encoding efficiency and encoded video quality are balanced, thereby improving an encoding effect.

In the solution shown in FIG. 3, to adapt to the multi-dimensional considerations of the ultra-high-definition video source, the computer device may determine various parameters in an AI manner to better match the video quality and the encoding parameter. The process may be shown in a subsequent embodiment.

Figure 5:
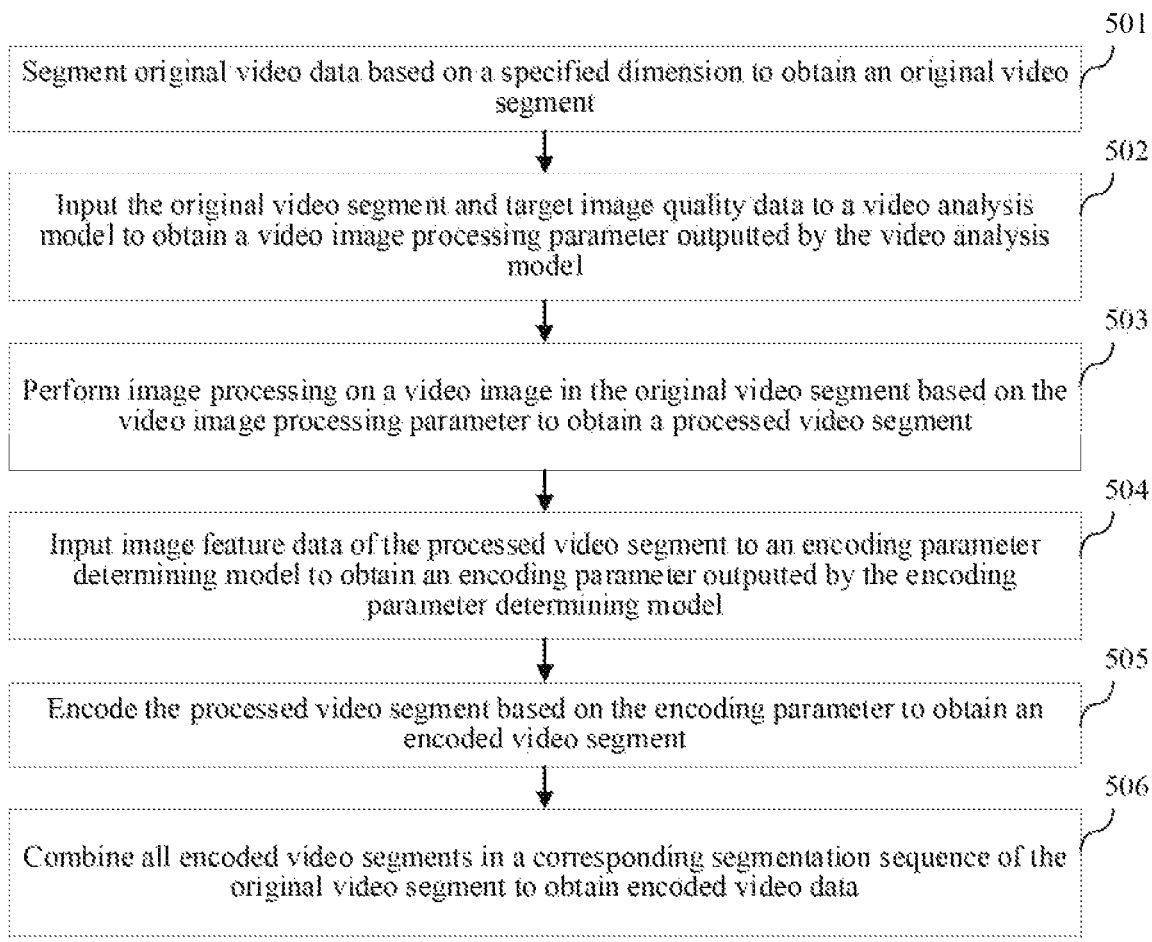
FIG. 5 is a flowchart of a video encoding method according to an exemplary embodiment.

FIG. 5 is a flowchart of an exemplary video encoding method according to an embodiment. The video encoding method may be applicable to a computer device. The computer device may be the server or the terminal in the system shown in FIG. 1. As shown in FIG. 5, for example, the computer device is the server in the system shown in FIG. 1. The video encoding method may include the following steps In Step 501, original video data can be segmented based on a specified dimension(s) of image property (or image characteristics) to obtain an original video segment.

The specified dimension of image property includes at least one of the following: distribution characteristics of a dark part and a highlight (bright) part in an image, a track (trajectory) and a motion degree of a motion area, color distribution and intensity, and details of a picture.

The server may divide the original video data into a plurality of head-to-tail original video segments based on times.

In an example, when performing shot segmentation, the server can consider more dimensions affecting visual experience of an ultra-high-definition video, rather than being limited to the similarity of image textures. In an example, the specified dimension of image property of shot segmentation may include:

(1) distribution characteristics of a dark part and a highlight part in an image;
(2) track and degree of a motion area;
(3) color distribution and intensity; and
(4) details of a picture, such as transitional layering of smooth areas.

In an example, when performing shot segmentation, the server may determine a segmentation point in the original video data based on one or more of the distribution characteristics of the dark part and the highlight part in the image, the track and degree of the motion area, the color distribution and intensity, and the details in the picture.

For example, the server may determine the segmentation point in the original video data based on one of the foregoing four dimensions. For example, the server may analyze distribution characteristics of dark parts and highlight parts of several video frames in an image before a video frame in the original video data and distribution characteristics of dark parts and highlight parts of several video frames in the image after the video frame, and determine the video frame as a segmentation point if differences between the distribution characteristics of the dark parts and the highlight parts of the several video frames in the image before and after the video frame satisfy a preset condition. Alternatively, the server may analyze tracks and degrees of motion areas of several video frames before a video frame in the original video data and tracks and degrees of motion areas of several video frames after the video frame, and may determine the video frame as a segmentation point if differences between the tracks and degrees of the motion areas of the several video frames before and after the video frame satisfy a preset condition. Segmentation of the rest of the frames may be deduced by analogy.

Alternatively, the server may determine a segmentation point in the original video data with reference to a plurality of dimensions in the foregoing four specified dimensions.

In Step 502, the original video segment and target image quality data can be input to a video analysis model to obtain a video image processing parameter outputted by the video analysis model.

In an example, the video analysis model is a machine learning model obtained through training performed by using a video segment sample, target image quality data of the video segment sample, and a video image processing parameter of the video segment sample.

In an example, a developer may pre-mark a training data set of the video analysis model. The training data set includes several video segment samples, target image quality data of the video segment samples, and video image processing parameters of the video segment samples. A model training device may obtain the video analysis model through training by using the training data set of the video analysis model.

In an example, the target image quality data includes an image quality level.

The image quality level may be a specified quality level, and may be a level of a standard parameter specified by a service. In an example, the image quality level may be represented by 1 to 10. 10 represents the highest quality, and 1 represents the lowest quality.

In an example, the video image processing parameter includes at least one of the following: a target frame rate, a target quantization bit depth, and a luminance adjustment curve.

According to the solution shown herein, the server may analyze video content by using a machine learning model, and output the most proper image parameter based on a specified visual quality factor for subsequent further preprocessing. A working principle thereof is that for frames with different content characteristics in an ultra-high-definition video, it is not always desired in terms of viewer experience for each of the dimensions shown in FIG. 2 to have a higher value. Moreover, because research on the principle of human vision is imperfect at the current stage, it is impossible to calculate and quantify each dimension through precise mathematical modeling.

Examples are as follows:

(1) For a live video of an electronic sports game, a higher frame rate indicates a better experience. However, for an ordinary natural collected image, for example, an indoor scene shot of a movie or television play without intensive motion, a high frame rate does not obviously improve viewing experience. Therefore, a higher bit rate is a waste for such shot encoding.

(2) For a picture with a simple texture and excessively fine luminance (such as blue sky, white cloud, a water surface, an indoor architectural shadow), a higher quantization bit depth can be employed to avoid artifacts such as bands and patches when the picture is rendered on an ultra-high-definition display. However, for a picture with a complex texture (such as jungles and rocks), there is a lot of edge information in itself, and it is wasteful to use a higher quantization bit depth.

Based on the foregoing principles, the server may analyze an inputted shot (that is, an inputted original video segment) to obtain a set of proper ultra-high-definition dimensional video image processing parameters.

Figure 6:
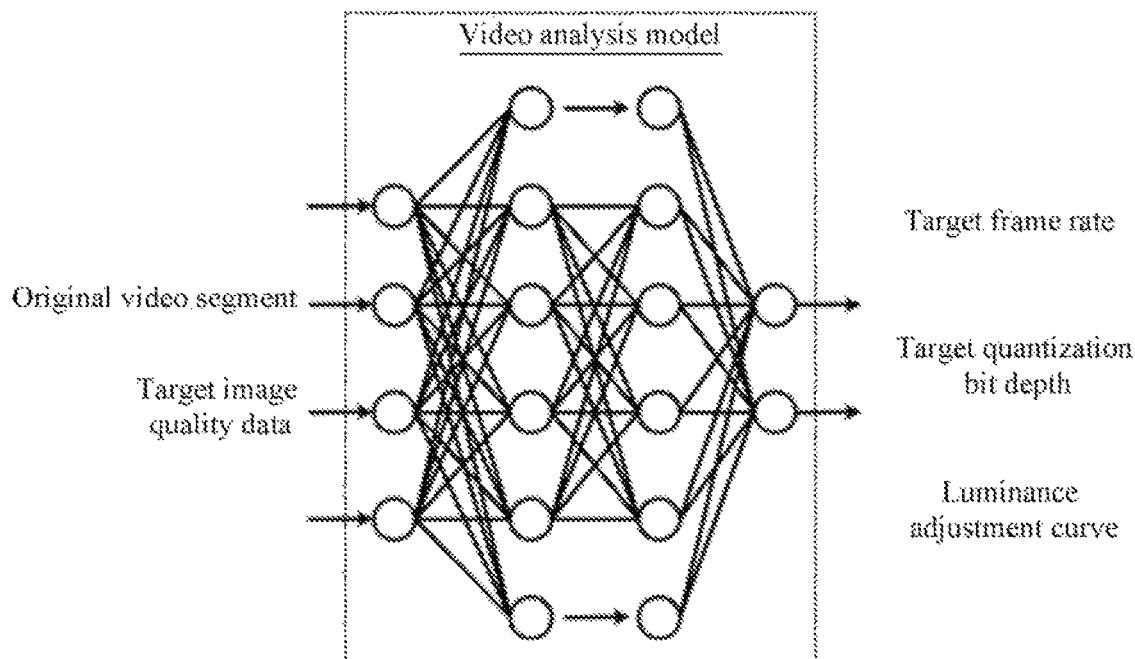
FIG. 6 is a schematic diagram of inputs and outputs of a video analysis model according to the embodiment shown in FIG. 5.

For example, FIG. 6 is a schematic diagram of inputs and outputs of the video analysis model according to an embodiment of the disclosure. As shown in FIG. 6, the server inputs an original video segment and expected target image quality data to an AI network model (that is, the foregoing video analysis model). By pre-training a marked data set, the AI network model may perform AI reasoning on an original image and a specified quality factor, and then output proper ultra-high-definition dimensional video image processing parameters.

In Step 503, image processing can be performed on a video image in the original video segment based on the video image processing parameters to obtain a processed video segment.

In an example, a manner for performing image processing on the video image in the original video segment may be as follows.

(1) In response to that the video image processing parameter includes the target frame rate and the target frame rate is higher than a frame rate of the original video segment, super frame rate processing can be performed on the original video segment through frame rate upsampling, to obtain the processed video segment. In response to that the video image processing parameter includes the target frame rate and the target frame rate is lower than the frame rate of the original video segment, cutting processing can be performed on the original video segment through frame rate downsampling, to obtain the processed video segment. In an example, in response to that the video image processing parameter includes the target frame rate and the target frame rate is equal to the frame rate of the original video segment, the frame rate of the original video segment can be maintained to obtain the processed video segment.

(2) In response to that the video image processing parameter includes the target quantization bit depth and the target quantization bit depth is lower than a quantization bit depth of the original video segment, downsampling quantization can be performed on the original video segment, to obtain the processed video segment. In response to that the video image processing parameter includes the target quantization bit depth and the target quantization bit depth is higher than the quantization bit depth of the original video segment, reverse high-precision inverse quantization can be performed on the original video segment, to obtain the processed video segment. In response to that the video image processing parameter includes the target quantization bit depth and the target quantization bit depth is equal to the quantization bit depth of the original video segment, the quantization bit depth of the original video segment can be maintained, to obtain the processed video segment.

(3) In response to that the video image processing parameter includes the luminance adjustment curve and a luminance range corresponding to the luminance adjustment curve is inconsistent with a luminance range of the original video segment, tone mapping can be performed on the original video segment based on the luminance adjustment curve, to obtain the processed video segment. In response to that the video image processing parameter includes the luminance adjustment curve and the luminance range corresponding to the luminance adjustment curve is consistent with the luminance range of the original video segment, a tone of the original video segment can be maintained to obtain the processed video segment.

In an example, when there are two or more video image processing parameters, the two or more video image processing parameters may be combined with reference to the foregoing three processing manners. For example, the video image processing parameter includes a target frame rate, a target quantization bit depth, and a luminance adjustment curve, where the target frame rate is higher than a frame rate of the original video segment, the target quantization bit depth is higher than a quantization bit depth of the original video segment, and a luminance range corresponding to the luminance adjustment curve is consistent with a luminance range of the original video segment. In this case, the server may perform super frame rate processing on the original video segment based on the target frame rate, perform high-precision inverse quantization processing on the original video segment based on the target quantization bit depth, and maintain a tone of the original video segment, to obtain the processed video segment.

In Step 504, image feature data of the processed video segment can be input to an encoding parameter determining model to obtain an encoding parameter outputted by the encoding parameter determining model.

In an example, the encoding parameter determining model is a machine learning model obtained through training performed by using an image feature data sample and an encoding parameter corresponding to the image feature data sample.

In an example, the image feature data includes at least one of the following: a frame rate, a quantization bit depth, maximum luminance, minimum luminance, an image type, a motion vector(s), and target image quality data.

In an example, the encoding parameter includes a bit rate.

In an example, the server may use a pre-trained AI model (that is, the encoding parameter determining model) to determine the encoding parameter of the processed video segment based on the image feature data of the processed video segment obtained in step 503.

In an example, a developer may pre-mark a training data set of the encoding parameter determining model. The training data set includes several image feature data samples and encoding parameters of the image feature data samples. A model training device may obtain the encoding parameter determining model through training by using the training data set of the encoding parameter determining model.

Figure 7:
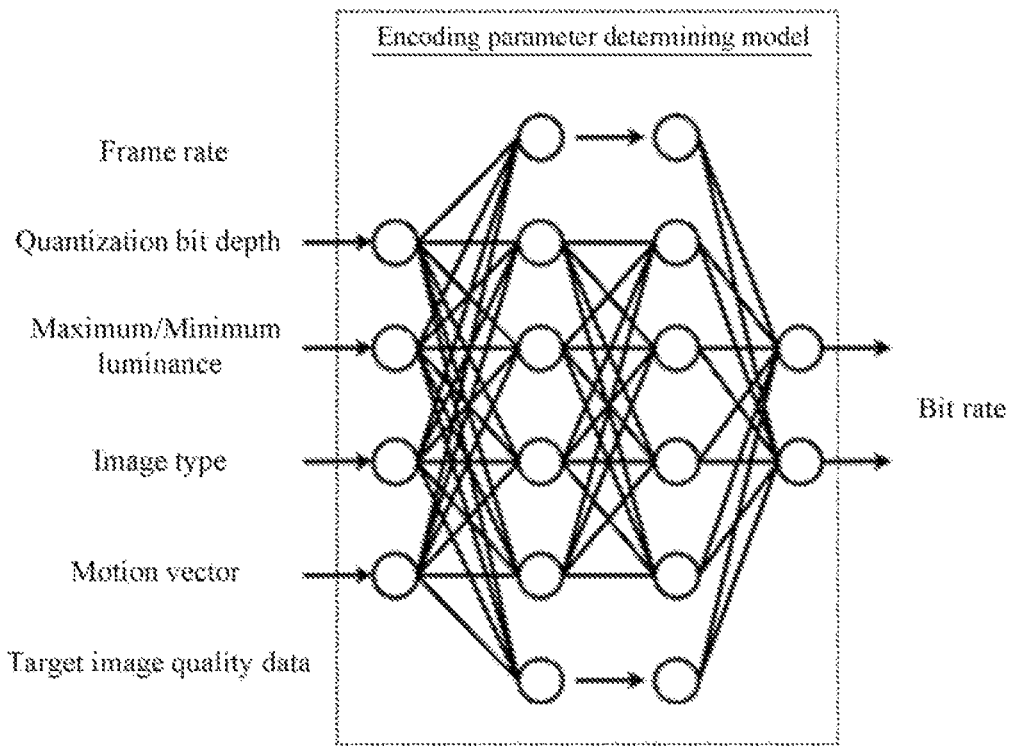
FIG. 7 is a schematic diagram of inputs and outputs of an encoding parameter determining model according to the embodiment shown in FIG. 5.

FIG. 7 is a schematic diagram of inputs and outputs of the encoding parameter determining model according to an embodiment of the disclosure. As shown in FIG. 7, the AI model may be a neural network model pre-trained by using a marked data set, an input thereof is several pieces of image feature data, and an output thereof is an encoding parameter under a specified image quality factor (that is, target image quality data), for example, a bit rate.

As shown in FIG. 7, the inputs of the model in an example include several dimensions directly associated with an ultra-high-definition video source, for example, a frame rate, a quantization bit depth, maximum luminance, minimum luminance, an image type, a motion vector, target image quality data, and the like.

An image type (for example, a type corresponding to an image having certain characteristics) and a motion vector of the processed video segment may be obtained through 1-pass encoding, for example, may be obtained through fast conditional random field (CRF) encoding or constant quantization factor QP encoding.

In Step 505, the processed video segment can be encoded based on the encoding parameter to obtain an encoded video segment.

In an example, the server may perform a compression encoding operation on the processed video segment based on the encoding parameter obtained in step 504.

In an example, an algorithm used in the compression encoding operation may use a common industry standard, for example, H.264/Advanced Video Coding (AVC), High Efficiency Video Coding (HEVC), VP9, Audio Video Coding Standard 2 (AVS2), and the like.

In an example, because an ultra-high-definition video source is processed, a compression encoding algorithm tool used may use a standard that includes an algorithm tool supporting an ultra-high-definition characteristic, such as HEVC, VVC, AV1, AVS3, and the like.

In Step 506, multiple encoded video segments in a corresponding segmentation sequence of the original video segments to obtain encoded video data.

According to the solution shown herein, before an encoding parameter is determined, first, image processing is performed on an original video segment; and then, an encoding parameter corresponding to a processed video segment is determined for encoding. Video image quality of a to-be-encoded video segment is controlled within a proper quality range to avoid excessively high or low video image quality of the to-be-encoded video segment. In this way, a relationship between the video quality and the encoding parameter can be controlled, so that encoding efficiency and encoded video quality are balanced, thereby improving an encoding effect.

In addition, according to the solution, when shot segmentation is performed, in consideration of a plurality of dimensions of an ultra-high-definition video, differences between different shots in luminance of dark parts/highlight parts, colors, fast motions, and detailed information are expanded to improve accuracy of video segmentation and further optimize compression efficiency in a subsequent shot.

In addition, according to the solution, a multi-dimensional characteristic of the ultra-high-definition video is introduced in a process of acquiring video image processing parameters and encoding parameters, and an association impact of image features such as a frame rate, a luminance range, and a quantization bit depth on image quality is considered, thereby improving an image encoding effect.

Figure 8:
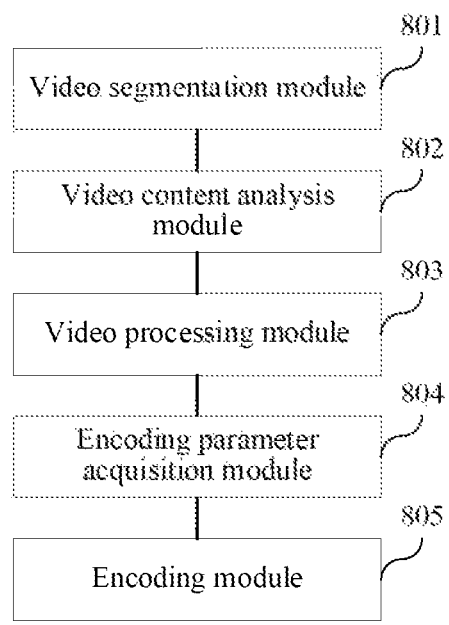
FIG. 8 is a structural block diagram of a video encoding apparatus according to an exemplary embodiment.

FIG. 8 is a structural block diagram of a video encoding apparatus according to an exemplary embodiment. The video encoding apparatus may perform all or some of the steps in the embodiment shown in FIG. 3 or FIG. 5. The apparatus may be a computer device, or may be disposed in a computer device. The video encoding apparatus may include a video segmentation module 801, a video content analysis module 802, a video processing module 803, an encoding parameter acquisition module 804, and an encoding module 805. Those elements are coupled together as shown in FIG. 8.

The video segmentation module 801 can be configured to segment original video data to obtain an original video segment.

The video content analysis module 802 can be configured to perform video content analysis on the original video segment to obtain a video image processing parameter corresponding to the original video segment.

The video processing module 803 can be configured to perform image processing on a video image in the original video segment based on the video image processing parameter to obtain a processed video segment.

The encoding parameter acquisition module 804 can be configured to acquire an encoding parameter of the processed video segment based on image feature data of the processed video segment.

The encoding module 805 can be configured to encode the processed video segment based on the encoding parameter to obtain an encoded video segment.

In an exemplary implementation, the video content analysis module 802 is configured to input the original video segment and target image quality data to a video analysis model to obtain the video image processing parameter outputted by the video analysis model, where the video analysis model is a machine learning model obtained through training performed by using a video segment sample, target image quality data of the video segment sample, and a video image processing parameter of the video segment sample.

In an exemplary implementation, the target image quality data includes an image quality level.

In an exemplary implementation, the video image processing parameter includes at least one of the following a target frame rate, a target quantization bit depth, and a luminance adjustment curve.

Figure 9:
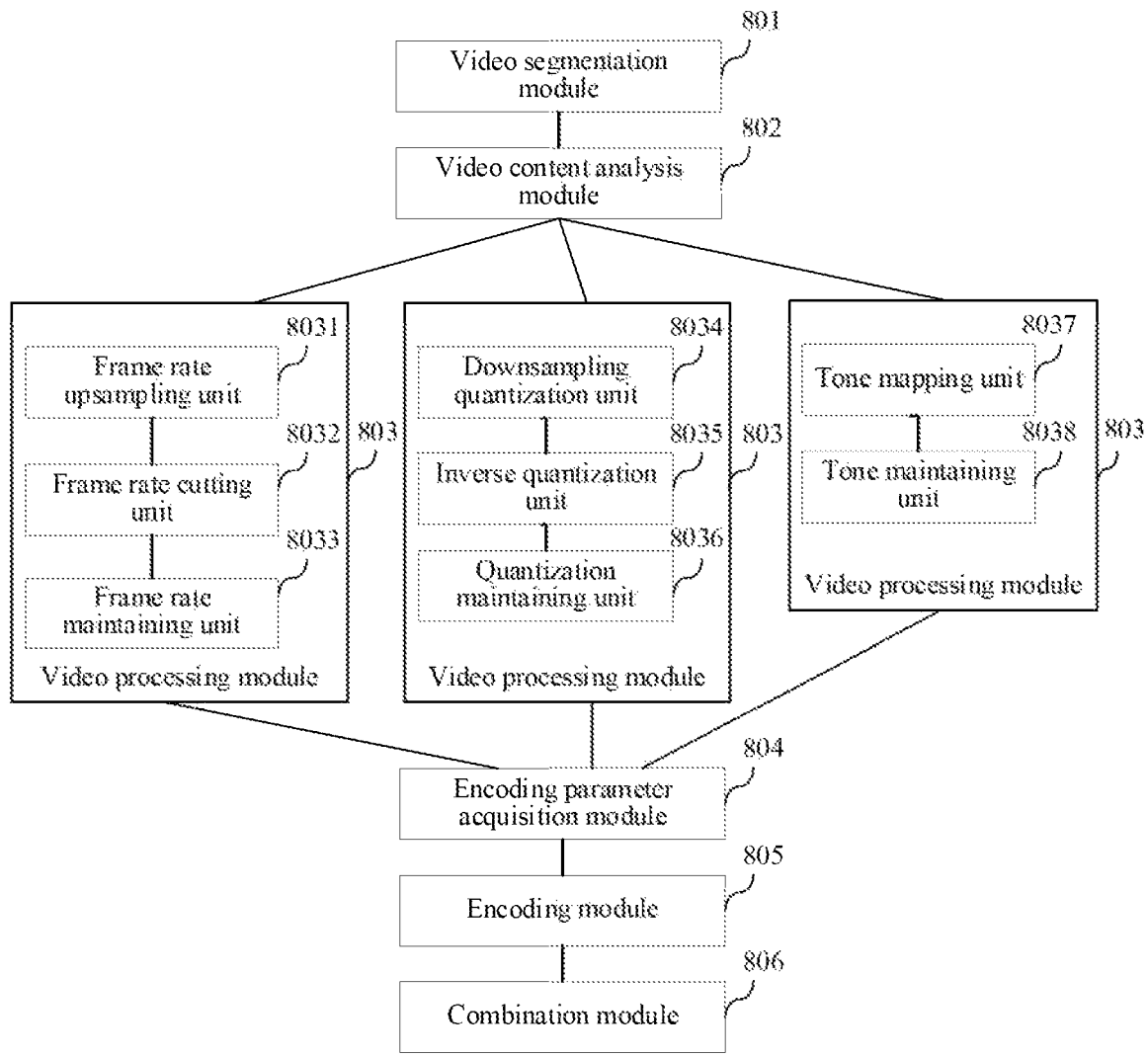
FIG. 9 is a structural block diagram of a video encoding apparatus according to an exemplary embodiment.

In an exemplary implementation, as shown in FIG. 9, the video processing module 803 includes a frame rate upsampling unit 8031, a frame rate cutting unit 8032, and a frame rate maintaining unit 8033.

The frame rate upsampling unit 8031 is configured to perform, in response to that the video image processing parameter includes the target frame rate and the target frame rate is higher than a frame rate of the original video segment, super frame rate processing on the original video segment through frame rate upsampling, to obtain the processed video segment.

The frame rate cutting unit 8032 is configured to perform, in response to that the video image processing parameter includes the target frame rate and the target frame rate is lower than a frame rate of the original video segment, cutting processing on the original video segment through frame rate downsampling, to obtain the processed video segment.

The frame rate maintaining unit 8033 is configured to maintain, in response to that the video image processing parameter includes the target frame rate and the target frame rate is equal to the frame rate of the original video segment, the frame rate of the original video segment, to obtain the processed video segment.

In an exemplary implementation, as shown in FIG. 9, the video processing module 803 includes a downsampling quantization unit 8034, an inverse quantization unit 8035, and a quantization maintaining unit 8036.

The downsampling quantization unit 8034 is configured to perform, in response to that the video image processing parameter includes the target quantization bit depth and the target quantization bit depth is lower than a quantization bit depth of the original video segment, downsampling quantization on the original video segment, to obtain the processed video segment;

The inverse quantization unit 8035 is configured to perform, in response to that the video image processing parameter includes the target quantization bit depth and the target quantization bit depth is higher than the quantization bit depth of the original video segment, reverse high-precision inverse quantization on the original video segment, to obtain the processed video segment.

The quantization maintaining unit 8036 is configured to maintain, in response to that the video image processing parameter includes the target quantization bit depth and the target quantization bit depth is equal to the quantization bit depth of the original video segment, the quantization bit depth of the original video segment rate, to obtain the processed video segment.

In an exemplary implementation, the video processing module 803 includes a tone mapping unit 8037 and a tone maintaining unit 8038.

The tone mapping unit 8037 is configured to perform, in response to that the video image processing parameter includes the luminance adjustment curve and a luminance range corresponding to the luminance adjustment curve is inconsistent with a luminance range of the original video segment, tone mapping on the original video segment based on the luminance adjustment curve, to obtain the processed video segment.

The tone maintaining unit 8038 is configured to maintain, in response to that the video image processing parameter includes the luminance adjustment curve and the luminance range corresponding to the luminance adjustment curve is consistent with the luminance range of the original video segment, a tone of the original video segment, to obtain the processed video segment.

In an exemplary implementation, the encoding parameter acquisition module 804 is configured to input the image feature data of the processed video segment to an encoding parameter determining model to obtain the encoding parameter outputted by the encoding parameter determining model, where the encoding parameter determining model is a machine learning model obtained through training performed by using an image feature data sample and an encoding parameter corresponding to the image feature data sample.

In an exemplary implementation, the image feature data includes at least one of the following: a frame rate, a quantization bit depth, maximum luminance, minimum luminance, an image type, a motion vector, and target image quality data.

In an exemplary implementation, the encoding parameter includes a bit rate.

In an exemplary implementation, the video segmentation module 801 is configured to segment the original video data based on properties of a specified dimension to obtain the original video segment, where the specified dimension includes at least one of the following: distribution characteristics of a dark part and a highlight part in an image, a track and a motion degree of a motion area, color distribution and intensity, and details of a picture.

In an exemplary implementation, as shown in FIG. 9, the apparatus further includes a combination module 806. The combination module 806 can be configured to combine all encoded video segments in a corresponding segmentation sequence of the original video segments to obtain encoded video data.

According to the solution described herein, before an encoding parameter is determined, first, image processing is performed on an original video segment; and then, an encoding parameter corresponding to a processed video segment is determined for encoding. Video image quality of a to-be-encoded video segment is controlled within a proper quality range to avoid excessively high or low video image quality of the to-be-encoded video segment. In this way, a relationship between the video quality and the encoding parameter can be controlled, so that encoding efficiency and encoded video quality are balanced, thereby improving an encoding effect.

In addition, according to the solution described herein, when shot segmentation is performed, in consideration of a plurality of dimensions of an ultra-high-definition video, differences between different shots in luminance of dark parts/highlight parts, colors, fast motions, and detailed information are expanded to improve accuracy of video segmentation and further optimize compression efficiency in a subsequent shot.

In addition, according to the solution described herein, a multi-dimensional characteristic of the ultra-high-definition video is introduced in a process of acquiring a video image processing parameter and an encoding parameter, and an association impact of image features such as a frame rate, a luminance range, and a quantization bit depth on image quality is considered, thereby improving an image encoding effect.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 10:
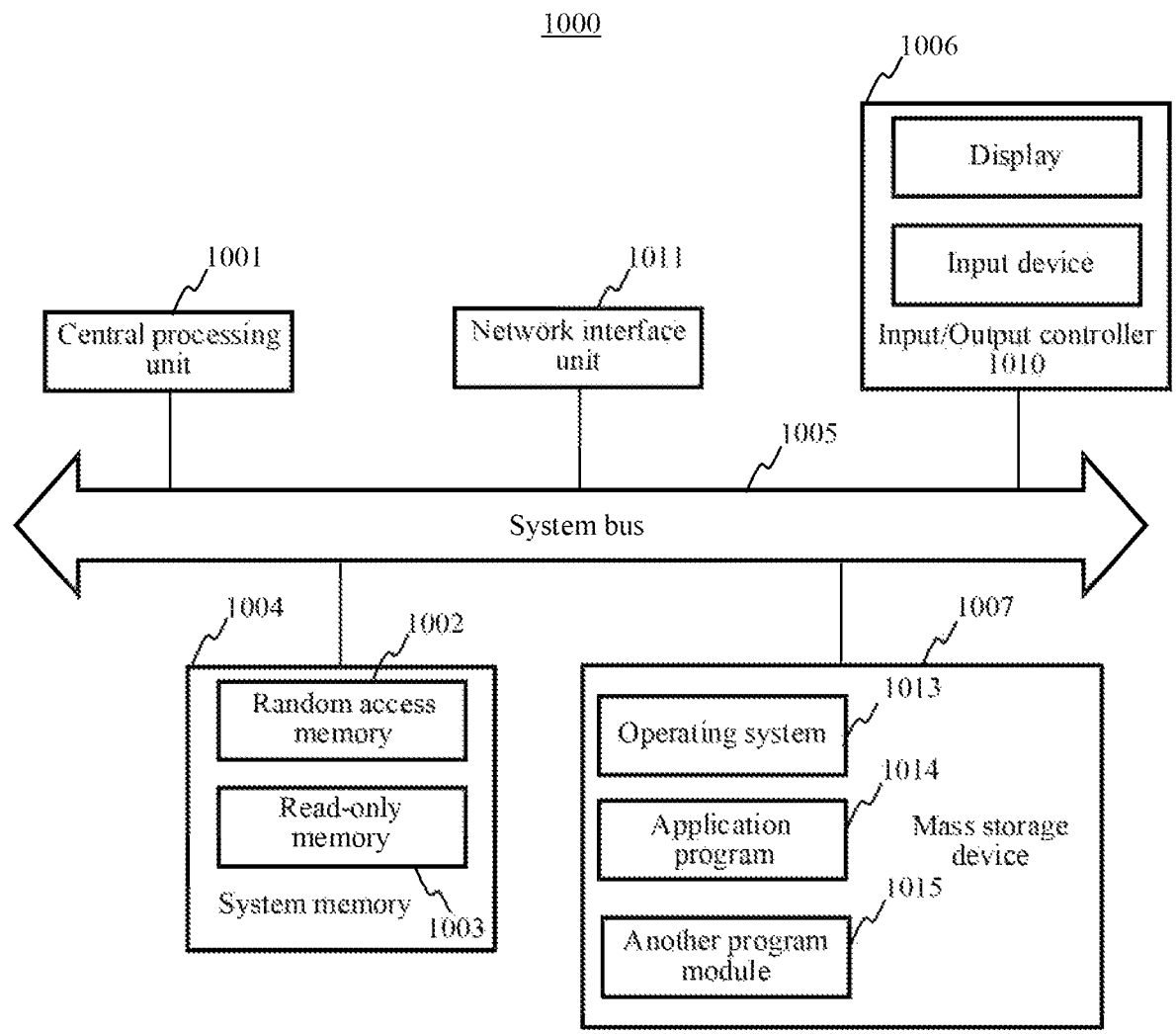
FIG. 10 is a schematic structural diagram of a computer device according to an exemplary embodiment.

FIG. 10 is a schematic structural diagram of a computer device according to an exemplary embodiment. The computer device may be implemented as a server on a network side. The server may be the server 120 shown in FIG. 1. The computer device 1000 includes a central processing unit (CPU) 1001, a system memory 1004 including a random access memory (RAM) 1002 and a read-only memory (ROM) 1003, and a system bus 1005 connecting the system memory 1004 to the CPU 1001. The computer device 1000 further includes a basic input/output system (I/O system) 1006 configured to transmit information between components in the computer, and a mass storage device 1007 configured to store an operating system 1013, an application program 1014, and another program module 1015.

The mass storage device 1007 is connected to the central processing unit 1001 by using a mass storage controller (not shown) connected to the system bus 1005. The mass storage device 1007 and an associated computer-readable medium provide nonvolatile storage for the computer device 1000. That is, the mass storage device 1007 may include a computer-readable medium (not shown) such as a hard disk or a compact disc read only memory (CD-ROM) drive.

In general, the computer-readable medium may include a non-transitory computer storage medium and a communication medium. The non-transitory computer-storage medium includes volatile and nonvolatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, it is known to a person skilled in the art that the computer storage medium is not limited to the foregoing types. The system memory 1004 and the mass storage device 1007 may be collectively referred to as a memory.

The computer device 1000 may be connected to the Internet or another network device by using a network interface unit 1011 connected to the system bus 1005.

The memory further includes one or more programs. The one or more programs are stored in the memory. The CPU 1001 executes the one or more programs to implement all or some steps of the method shown in FIG. 3 or FIG. 5.

FIG. 1 is a structural block diagram of a computer device 1100 according to an exemplary embodiment of this application. The computer device 1100 may be a terminal, and the terminal may be the terminal 160 shown in FIG. 1.

Generally, the computer device 1100 includes a processor 1101 and a memory 1102.

The processor 1101 may include processing circuitry, such as one or more processing cores. For example, the processor may be a 4-core processor or an 8-core processor. The processor 1101 may be implemented in at least one hardware form of digital signal processor (DSP), a field programmable gate array (FPGA), and a programmable logic array (PLA). The processor 1101 may include a main processor and a coprocessor. In some embodiments, the processor 1101 may be integrated with a graphics processing unit (GPU). In some embodiments, the processor 1101 may further include an AI processor. The AI processor is configured to process a computing operation related to ML.

The memory 1102 may include one or more non-transitory computer-readable storage media. The computer-readable storage medium may be non-transient. The memory 1102 may further include a high-speed random access memory (RAM) and a nonvolatile memory, for example, one or more disk storage devices or flash storage devices. In some embodiments, a non-transitory computer-readable storage medium in the memory 1102 is configured to store at least one instruction, the at least one instruction being configured to be executed by the processor 1101 to implement the method provided in the method embodiments of this application.

In some embodiments, the computer device 1100 further optionally includes a peripheral interface 1103 and at least one peripheral. The processor 1101, the memory 1102, and the peripheral device interface 1103 may be connected by using a bus or a signal cable. Each peripheral may be connected to the peripheral interface 1103 by using a bus, a signal cable, or a circuit board. The peripheral includes at least one of the following: a radio frequency (RF) circuit 1104, a display screen 1105, a camera assembly 1106, an audio circuit 1107, a positioning component 1108, and a power supply 1109.

The peripheral interface 1103 may be configured to connect at least one peripheral related to I/O to the processor 1101 and the memory 1102.

The RF circuit 1104 is configured to receive and transmit an RF signal, also referred to as an electromagnetic signal. Optionally, the RF circuit 1104 includes an antenna system, an RF transceiver, one or more amplifiers, a tuner, an oscillator, a digital signal processor, a codec chipset, a subscriber identity module card, and the like. In some embodiments, the RF circuit 1104 may further include a circuit related to near field communication (NFC), which is not limited in this application.

The display screen 1105 is configured to display a user interface (UI). The UI may include a graph, a text, an icon, a video, and any combination thereof. When the display screen 1105 is a touch display screen, the display screen 1105 further has a capability of acquiring a touch signal on or above a surface of the display screen 1105. The display screen 1105 may be prepared by using materials such as a liquid crystal display (LCD), an organic light-emitting diode (OLED), or the like.

A camera assembly 1106 is configured to acquire an image or a video. Optionally, the camera assembly 1106 includes a front-facing camera and a rear-facing camera. In some embodiments, the camera assembly 1106 may further include a flash.

The audio circuit 1107 may include a microphone and a loudspeaker. For the purpose of stereo sound acquisition or noise reduction, there may be a plurality of microphones, respectively disposed at different parts of the computer device 1100. In some embodiments, the audio circuit 1107 may also include an earphone jack.

The positioning component 1108 is configured to determine a current geographic location of the computer device 1100 through positioning, to implement navigation or a location based service (LBS).

The power supply 1109 is configured to supply power to components in the computer device 1100.

In some embodiments, the computer device 1100 may further include one or more sensors 1110. The one or more sensors 1110 include, but are not limited to, an acceleration sensor 1111, a gyroscope sensor 1112, a pressure sensor 1113, a fingerprint sensor 1114, an optical sensor 1115, and a proximity sensor 1116.

Figure 11:
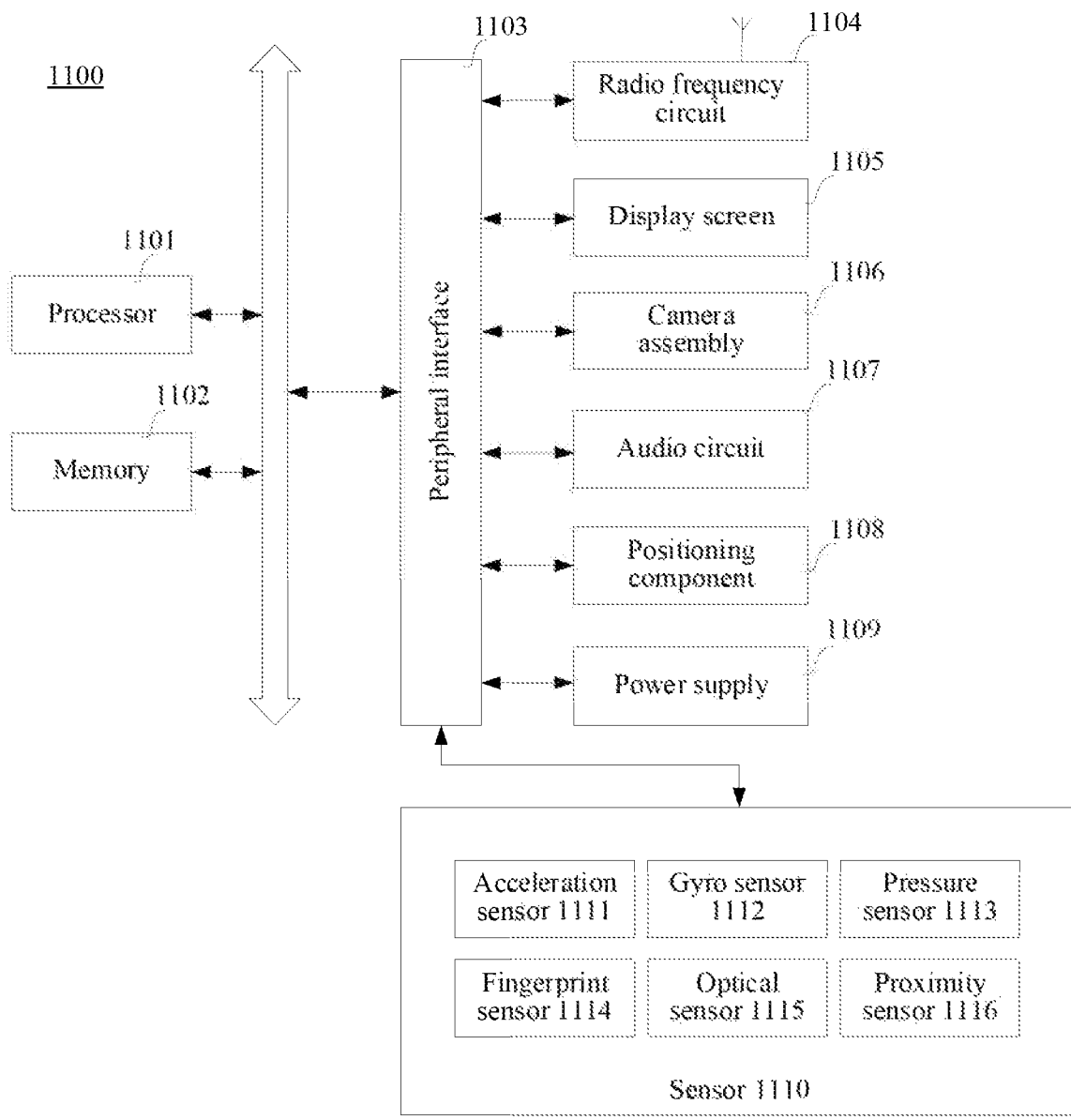
FIG. 11 is a schematic structural diagram of a computer device according to an exemplary embodiment.

A person skilled in the art may understand that the structure shown in FIG. 11 does not constitute any limitation on the computer device 1100, and the computer device may include more components or fewer components than those shown in the figure, or some components may be combined, or a different component deployment may be used.

In an exemplary embodiment, a non-transitory computer-readable storage medium including instructions, for example, a memory including a computer program (an instruction), is further provided, and the program (the instruction) may be executed by a processor of a computer device to complete all or some of steps of the methods shown in the embodiments of this application. For example, the non-temporary computer-readable storage medium may be a ROM, a RAM, a CD-ROM, a magnetic tape, a floppy disk, an optical data storage device, and the like.

Other embodiments of this application can be derived by a person skilled in the art upon consideration of the specification and practice of the disclosure here. For example, variations, uses, or adaptive changes of this application can be derived. Such variations, uses or adaptive changes follow the general principles of this application, and include well-known knowledge and related technical means in the art that are not disclosed in this application. The specification and the embodiments are considered merely exemplary, and the scope and spirit of this application are pointed out in the following claims.

It is to be understood that this application is not limited to the precise structures described above and shown in the accompanying drawings, and various modifications and changes can be made without departing from the scope of this application.

What is claimed is:

1. A method of video encoding, comprising:
   segmenting, by processing circuitry, original video data to obtain an original video segment including multiple video images;
   inputting the original video segment and target image quality data to a video analysis model;
   obtaining a video image processing parameter corresponding to the original video segment from a plurality of video image processing parameters and outputted by the video analysis model;
   performing, by the processing circuitry, image processing on a video image in the multiple video images in the original video segment based on the video image processing parameter to obtain a processed video segment;
   determining, by the processing circuitry, an encoding parameter of the processed video segment from a plurality of encoding parameters based on image feature data of the processed video segment, the image feature data of the processed video segment being extracted from the processed video segment; and
   encoding, by the processing circuitry, the processed video segment based on the encoding parameter and respective associations between the plurality of video image processing parameters and the plurality of encoding parameters to obtain an encoded video segment.

2. The method according to claim 1, wherein
   the video analysis model is a machine learning model obtained through training performed by using a video segment sample, target image quality data of the video segment sample, and a video image processing parameter of the video segment sample.

3. The method according to claim 2, wherein the target image quality data comprises an image quality level indicating a target image quality for encoding the original video segment.

4. The method according to claim 3, wherein the video image processing parameter comprises at least one of the following:
   a target frame rate, a target quantization bit depth, and a luminance adjustment curve.

5. The method according to claim 4, wherein the performing the image processing comprises:
   in response to that the video image processing parameter comprises the target frame rate and the target frame rate is higher than a frame rate of the original video segment, adjusting the frame rate of the original video segment through frame rate upsampling to obtain the processed video segment;
   in response to that the video image processing parameter comprises the target frame rate and the target frame rate is lower than the frame rate of the original video segment, adjusting the frame rate of the original video segment through frame rate downsampling to obtain the processed video segment; and
   in response to that the video image processing parameter comprises the target frame rate and the target frame rate is equal to the frame rate of the original video segment, maintaining the frame rate of the original video segment to obtain the processed video segment.

6. The method according to claim 4, wherein the performing the image processing comprises:
   in response to that the video image processing parameter comprises the target quantization bit depth and the target quantization bit depth is lower than a quantization bit depth of the original video segment, performing downsampling quantization on the original video segment to reduce the quantization bit depth of the original video segment to obtain the processed video segment;
   in response to that the video image processing parameter comprises the target quantization bit depth and the target quantization bit depth is higher than the quantization bit depth of the original video segment, performing reverse high-precision inverse quantization on the original video segment to increase the quantization bit depth of the original video segment to obtain the processed video segment; and
   in response to that the video image processing parameter comprises the target quantization bit depth and the target quantization bit depth is equal to the quantization bit depth of the original video segment, maintaining the quantization bit depth of the original video segment to obtain the processed video segment.

7. The method according to claim 4, wherein the performing the image processing comprises:
   in response to that the video image processing parameter comprises the luminance adjustment curve and a luminance range corresponding to the luminance adjustment curve is inconsistent with a luminance range of the original video segment, performing tone mapping on the original video segment based on the luminance adjustment curve to obtain the processed video segment; and
   in response to that the video image processing parameter comprises the luminance adjustment curve and the luminance range corresponding to the luminance adjustment curve is consistent with the luminance range of the original video segment, maintaining a tone of the original video segment to obtain the processed video segment.

8. The method according to claim 1, wherein the determining comprises:
   inputting the image feature data of the processed video segment to an encoding parameter determining model to obtain the encoding parameter outputted by the encoding parameter determining model, wherein
   the encoding parameter determining model is a machine learning model obtained through training performed by using an image feature data sample and an encoding parameter corresponding to the image feature data sample.

9. The method according to claim 8, wherein the image feature data comprises at least one of the following:
a frame rate, a quantization bit depth, a maximum luminance, a minimum luminance, an image type, a motion vector, and target image quality data.

10. The method according to claim 9, wherein the encoding parameter comprises a bit rate.

11. The method according to claim 1, wherein the segmenting comprises:
segmenting the original video data based on a specified dimension of image property to obtain the original video segment, wherein
the specified dimension of image property comprises at least one of distribution characteristics of a dark part and a highlight part in an image, a track and a motion degree of a motion area, color distribution and intensity, and details of a picture.

12. The method according to claim 1, wherein the method further comprises:
combining all encoded video segments in a corresponding segmentation sequence of the original video data to obtain encoded video data.

13. An apparatus of video encoding, comprising:
processing circuitry configured to
segment original video data to obtain an original video segment including multiple video images;
input the original video segment and target image quality data to a video analysis model;
obtain a video image processing parameter corresponding to the original video segment from a plurality of video image processing parameters and outputted by the video analysis model;
perform image processing on a video image in the multiple video images in the original video segment based on the video image processing parameter to obtain a processed video segment;
determine an encoding parameter of the processed video segment from a plurality of encoding parameters based on image feature data of the processed video segment, the image feature data of the processed video segment being extracted from the processed video segment; and
encode the processed video segment based on the encoding parameter and respective associations between the plurality of video image processing parameters and the plurality of encoding parameters to obtain an encoded video segment.

14. The apparatus according to claim 13, wherein
the video analysis model is a machine learning model obtained through training performed by using a video segment sample, target image quality data of the video segment sample, and a video image processing parameter of the video segment sample.

15. The apparatus according to claim 14, wherein the target image quality data comprises an image quality level indicating a target image quality for encoding the original video segment.

16. The apparatus according to claim 15, wherein the video image processing parameter comprises at least one of the following:
a target frame rate, a target quantization bit depth, and a luminance adjustment curve.

17. The apparatus according to claim 16, wherein the processing circuitry is further configured to:
in response to that the video image processing parameter comprises the target frame rate and the target frame rate is higher than a frame rate of the original video segment, adjust the frame rate of the original video segment through frame rate upsampling to obtain the processed video segment;
in response to that the video image processing parameter comprises the target frame rate and the target frame rate is lower than the frame rate of the original video segment, adjust the frame rate of the original video segment through frame rate downsampling to obtain the processed video segment; and
in response to that the video image processing parameter comprises the target frame rate and the target frame rate is equal to the frame rate of the original video segment, maintain the frame rate of the original video segment to obtain the processed video segment.

18. The apparatus according to claim 16, wherein the processing circuitry is further configured to:
in response to that the video image processing parameter comprises the target quantization bit depth and the target quantization bit depth is lower than a quantization bit depth of the original video segment, perform downsampling quantization on the original video segment to reduce the quantization bit depth of the original video segment to obtain the processed video segment;
in response to that the video image processing parameter comprises the target quantization bit depth and the target quantization bit depth is higher than the quantization bit depth of the original video segment, perform reverse high-precision inverse quantization on the original video segment to increase the quantization bit depth of the original video segment to obtain the processed video segment; and
in response to that the video image processing parameter comprises the target quantization bit depth and the target quantization bit depth is equal to the quantization bit depth of the original video segment, maintain the quantization bit depth of the original video segment to obtain the processed video segment.

19. The apparatus according to claim 16, wherein the processing circuitry is further configured to:
in response to that the video image processing parameter comprises the luminance adjustment curve and a luminance range corresponding to the luminance adjustment curve is inconsistent with a luminance range of the original video segment, perform tone mapping on the original video segment based on the luminance adjustment curve to obtain the processed video segment; and
in response to that the video image processing parameter comprises the luminance adjustment curve and the luminance range corresponding to the luminance adjustment curve is consistent with the luminance range of the original video segment, maintain a tone of the original video segment to obtain the processed video segment.

20. A non-transitory computer-readable storage medium storing instructions which when executed by at least one processor cause the at least one processor to perform:
segmenting original video data to obtain an original video segment including multiple video images;
inputting the original video segment and target image quality data to a video analysis model;
obtaining a video image processing parameter corresponding to the original video segment from a plurality of video image processing parameters and outputted by the video analysis model;
performing image processing on a video image in the multiple video images in the original video segment based on the video image processing parameter to obtain a processed video segment;

determining an encoding parameter of the processed video segment from a plurality of encoding parameters based on image feature data of the processed video segment, the image feature data of the processed video segment being extracted from the processed video segment; and encoding the processed video segment based on the encoding parameter and respective associations between the plurality of video image processing parameters and the plurality of encoding parameters to obtain an encoded video segment.

* * * * *